A. ROZWUD.
INSECT TRAP.
APPLICATION FILED JULY 19, 1916.
1,219,665.
Patented Mar. 20, 1917.
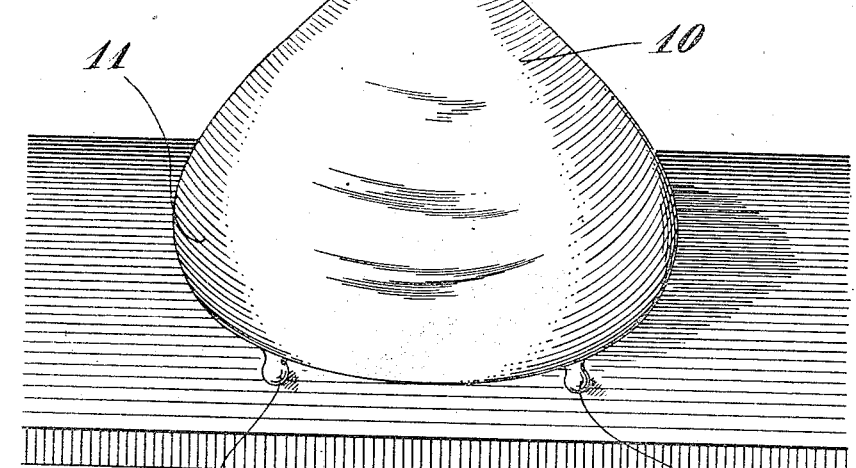
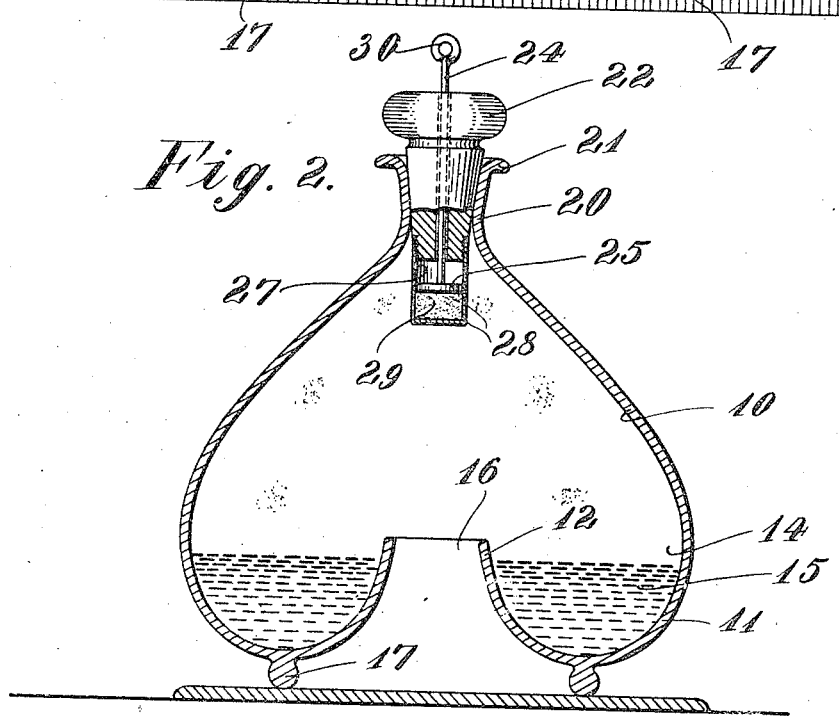
Inventor
Andrzej Rozwud
By his Attorney
Oscar Geier

UNITED STATES PATENT OFFICE.

ANDRZEJ ROZWUD, OF DETROIT, MICHIGAN.

INSECT-TRAP.

1,219,665.  Specification of Letters Patent.  Patented Mar. 20, 1917.

Application filed July 19, 1916. Serial No. 110,036.

*To all whom it may concern:*

Be it known that I, ANDRZEJ ROZWUD, a subject of the Czar of Russia, and a resident of Detroit, in the county of Wayne and State of Michigan, have invented certain new and useful Improvements in Insect-Traps, of which the following is a specification.

This invention relates to improvements in devices for trapping insects, with special reference to common house flies, and its principal object is to provide a device for this purpose, neat in appearance, and effective in its purpose.

A further object is to provide means whereby the medium used in the destruction of the insects may be maintained in a sanitary condition by the addition, from time to time, of a suitable antiseptic maintained in the upper portion of the apparatus.

These and other objects are attained by the novel design and construction of parts hereafter described and shown in the accompanying drawing, forming a material part of this disclosure, and in which:—

Figure 1 is a perspective view of a complete apparatus as made in accordance with the invention, and Fig. 2 is a vertical cross sectional view taken substantially on the center line of the same.

The device is comprised of a globular receptacle 10 having a bulbous lower portion 11, the interior of which is provided with upturned walls 12 forming an annular receptacle 14 adapted to contain fluids 15, for entrapping the insects, which may enter the opening or clear central passage-way 16 in an obvious manner.

Three or more supports 17 are formed on the base of the receptacle, the same being of such height as to allow the insects to pass freely therein, the supports resting upon any convenient level surface, as a table, stand or shelf.

The upper portion of the receptacle is formed into a contracted neck 20 having a slightly tapering interior with out-turned edges 21, the same being similar to the mouth of any common bottle, and suited to the mouth is a stopper 22, the same being of such shape as to enable it to be operated by the fingers.

Passing centrally downward through the stopper is a rod 24, the lower end of which is engaged with a plunger 25 below the stopper, the plunger being slidable within a cylinder 27 having lateral perforations 28 through which the disinfectant or antiseptic 29 may be extruded under pressure of the plunger by operating the handle 30 of the rod, which extends upon the stopper.

It is to be noted that the openings 28 are such as to cause the disinfectant to be ejected so that the same will be received within the annular chamber 14 and not to drop by gravity, so as to pass through the opening 16.

When it is desired to renew the contents, or cleanse the receptacle, the stopper 22, together with the cylinder 27, which is rigidly attached thereto, may be withdrawn and the contents allowed to pass through the mouth of the receptacle in an obvious manner.

In filling the same, the stopper should be in position and the contents admitted through the opening 16.

Having thus described my invention, what I claim as new and desire to secure by Letters Patent, is:—

1. In a fly trap of the type described, the combination with a hollow receptacle having a mouth, an annular chamber in its base, and an entrance leading thereto, means permitting passage to said entrance, a stopper suited to the mouth of said receptacle, a cylinder engaged with said stopper, said cylinder being adapted to contain an antiseptic, a plunger movable in said cylinder, and means for operating said plunger, said operating means extending through and above said stopper.

2. In a fly trap of the type described, the combination with a hollow vessel having a bulbous base adapted to contain fluids, and an open passage-way leading thereto, of a stopper movably engaged in the mouth of said vessel, a closed cylinder engaged with said stopper, said cylinder having a plurality of lateral apertures, a plunger slidable in said cylinder, and an operating means for said plunger.

Signed at Detroit, in the county of Wayne, and State of Michigan, this 19 day of June, A. D. 1916.

ANDRZEJ ROZWUD.